United States Patent [19]

Engstrom

[11] 4,379,224
[45] Apr. 5, 1983

[54] APPARATUS FOR INTERPRETING CODE 39 BAR CODE DATA

[75] Inventor: Robert J. Engstrom, Minneapolis, Minn.

[73] Assignee: Honeywell Inc., Minneapolis, Minn.

[21] Appl. No.: 267,151

[22] Filed: May 26, 1981

[51] Int. Cl.$^3$ .............................................. G06K 7/10
[52] U.S. Cl. ................................... 235/463; 235/462; 235/472
[58] Field of Search ........................ 235/463, 462, 472

[56] References Cited

U.S. PATENT DOCUMENTS 4,140,271  2/1979  Nojiri ................................. 235/463

*Primary Examiner*—Harold I. Pitts
*Attorney, Agent, or Firm*—Roger W. Jensen

[57] ABSTRACT

An apparatus for interpreting digital output signals from a Code 39 bar code data system wherein all of the bars and spaces in a signal code character are measured for time duration, minimum and maximum widths bars and spaces are identified, first bar cutoff and space cutoff values are respectively produced having a time duration approximately 1.5 times the time duration of the minimum width bar and space, second bar cutoff and space cutoff values are respectively produced having a time duration approximately equal to one-half of the sum of the time duration of the minimum and maximum width bars and spaces and means are provided for respectively comparing the first and second bar cutoff values and space cutoff values and for using the greater of such values as a reference against which all of the bars and spaces in said characters are respectively measured. The identification is made on the basis of the bars and spaces respectively having a time duration greater than that of the corresponding bar cutoff value or space cutoff value being interpreted as wide bars and spaces and those bars and spaces having a time duration less than that of the corresponding bar cutoff value or space cutoff value being interpreted as narrow bars and spaces respectively.

3 Claims, 4 Drawing Figures

APPARATUS FOR INTERPRETING CODE 39 BAR CODE DATA

Alphanumeric bar codes are in widespread use being used for example to identify various products on sale in a supermarket or department store. A special alphanumeric bar code known as Code 39, a trademark of Interface Mechanism, Inc., Lynnwood, Wash., is in widespread use. The alphanumeric information in the code in digital form is read or measured by an optical wand or code pen having an analog signal output which is indicative of the bar code data. Electrical conditioning means are connected to the code or pen to receive such analog output signal and to produce a digital output signal indicative of the bar code data. The digital signal is characterized by being made up of a plurality of relatively narrow and/or wide bars separated by a plurality of relatively narrow and/or wide spaces.

It will be understood that it is very important to the integrity or intelligence of the system to be able to accurately differentiate between wide bars and spaces and narrow bars and spaces. This is not always readily accomplished. First of all there can be, and usually is, a certain variation in the widths of the bars and spaces in the bar code per se as printed or otherwise marked, i.e., when the bar code is made. Secondly, the angle of incidence between the optical wand or code pen has a significant effect on the nature of the output signal; it being recognized that different operators of the code pens will use different angles of incidence and even the same operator from time to time will change the angle of incidence. Also the speed of movement of the code pen over the code frequently is non-uniform. All of these factors effect the width of the bars and spaces as such appear in the output signals.

SUMMARY OF THE INVENTION

My invention is an apparatus for interpreting Code 39 bar code data with a significant improvement over the prior art being a much more reliable means for distinguishing or differentiating between wide and/or narrow bars and spaces.

DESCRIPTION OF THE PREFERRED EMBODIMENT

Figure 1:
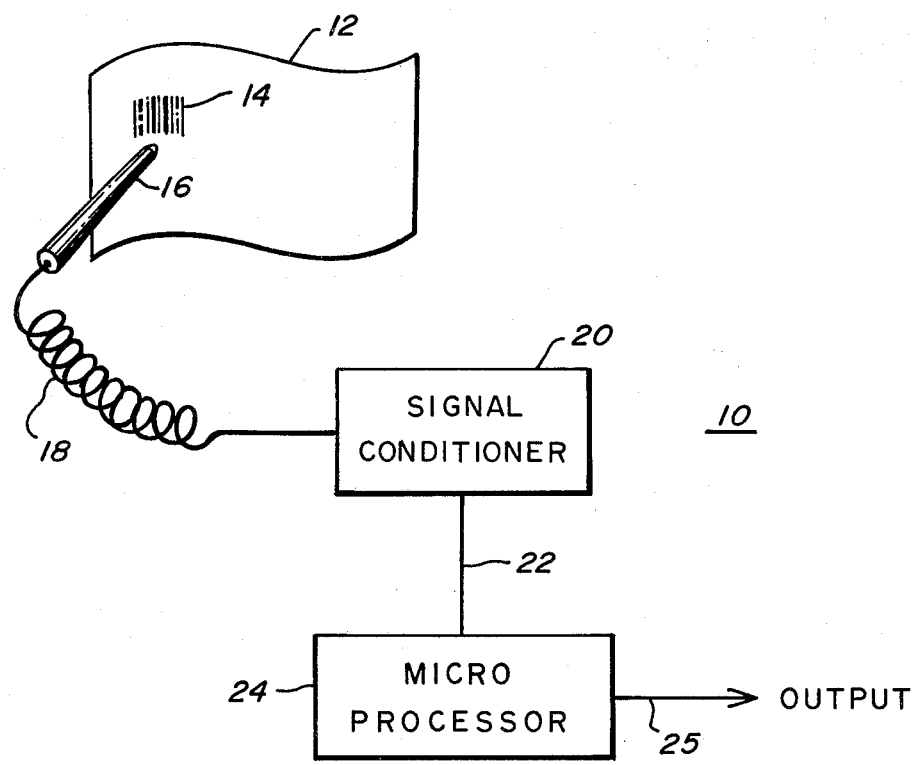
FIG. 1 is a block diagram of my system comprising in part a microprocessor.
Figure 2:
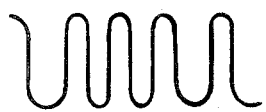
FIG. 2 is a graph showing a representative analog output signal from an optical wand or code pen.
Figure 3:
FIG. 3 is a graph showing a representative digital output signal from a signal conditioner.

Referring to FIG. 1 the reference numeral 10 generally designates a bar code measuring and interpretation system. An item 12, e.g., a supermarket product, having thereon an alphanumeric bar code 14 of the aforedescribed Code 39 type is adapted to be read by an optical wand or code pen 16, such as the code pen manufactured by SKAN-A-MATIC Corporation of Elbridge, N.Y. The output from pen 16 is coupled through an appropriate lead 18 to a signal conditioner 20 which may also be of the type produced by SKAN-A-MATIC Corporation, i.e., the T21029 signal linearizer and the T21039 wave converter. As is well understood, the output from the optical wand or code pen 16 will be an analog signal having a magnitude indicative of the data on the bar code 14, this being represented by the wave form shown in FIG. 2. The signal linearizer in the signal conditioner 20 converts the analog signal from the code pen into a proportional and amplified linear voltage; then a solid state switch in the wave converter of the signal conditioner is utilized to provide a digital voltage output as is depicted in FIG. 3. The digital output from the signal conditioner 20 at its low level (near ground) represents the white or more reflective part of the code. At its high level it represents the dark or less reflective portion of the code. The code is thus presented as a square-wave signal with a positive pulse with a pulse width proportional to the width of each blank bar and a zero pulse or space with a pulse width proportional to the width of each white space.

The output from signal conditioner 20 is applied through a connection means 22 to a microprocessor 24 having an output 25. An appropriate microprocessor for this application is the model number M6800 made by the Motorola Corporation having their model number M6800.

Figure 4:
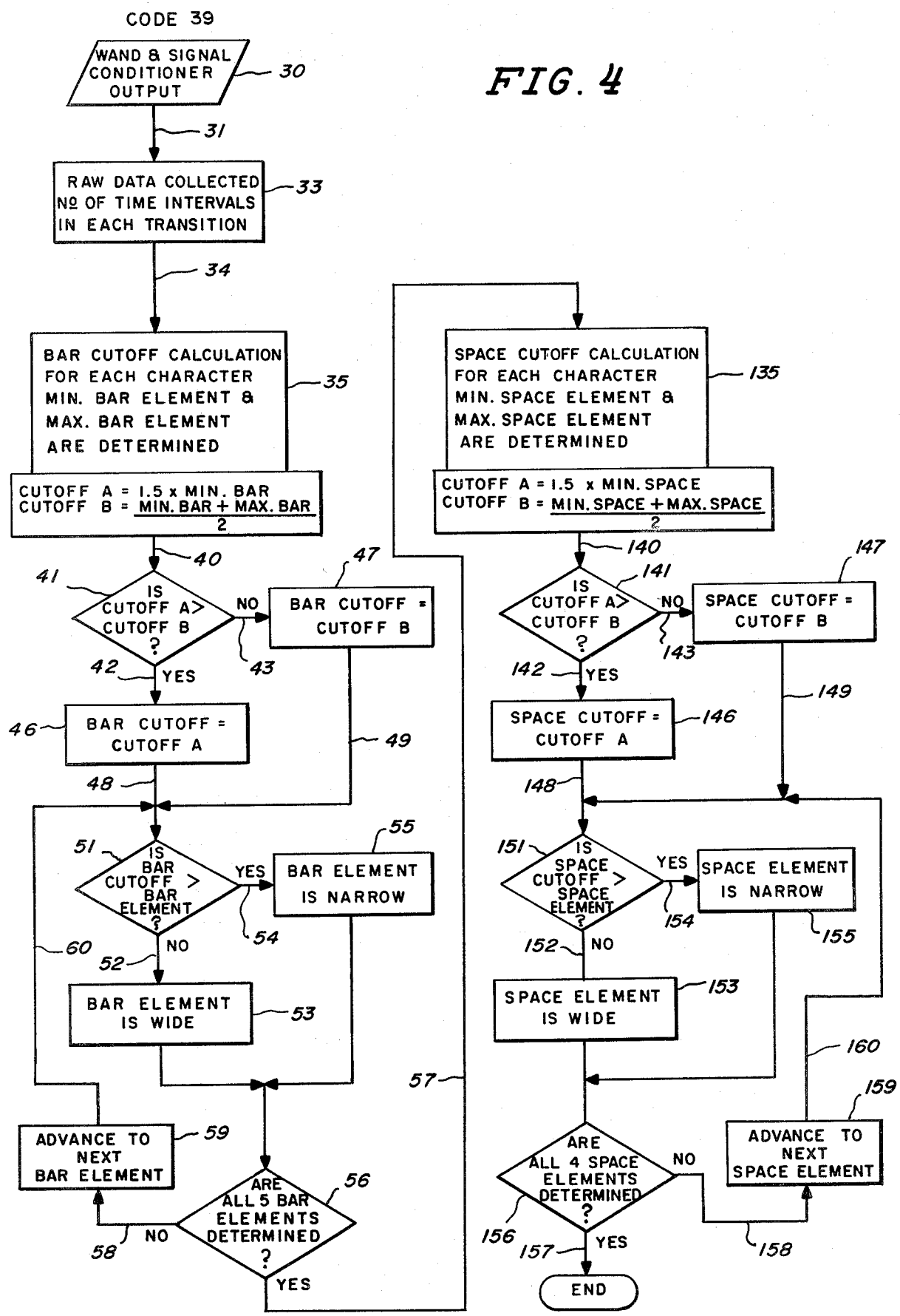
FIG. 4 is a flow diagram or flow chart for the system depicted in FIG. 1.

Referring to the flow chart of FIG. 4, reference numeral 30 generally depicts the wand and signal conditioner output of FIG. 1, the output at 31 being in the form of the digital signal depicted in FIG. 3. The flow from 30 via 31 is to an instruction block 33 RAW DATA COLLECTED—NUMBER OF TIME INTERVALS IN EACH TRANSITION which is indicative of each transition in each character in the bar code being measured by timing apparatus within the microprocessor 24 so as to determine the number of time intervals in each transition, i.e., measuring the time duration for each bar and for each space between bars, said time duration data for all bars and all spaces in a code character being stored.

The flow from 33 is via 34 to an instruction block 35 BAR CUTOFF CALCULATION FOR EACH CHARACTER. In this phase of the operation the minimum bar element and the maximum bar element for each character are determined. A "Cut off A" time reference is calculated by multiplying 1.5 times the time duration of the minimum bar element. Further a second cutoff time reference or "Cutoff B" determined by taking one-half of the summation of the time durations of minimum bar and and the maximum bar length. The flow 35 is via 40 to a logic instruction block 41 IS CUTOFF A GREATER THAN CUTOFF B having a "yes" output 42 flowing to an instruction block 46 BAR CUTOFF=CUTOFF A and a "no" response 43 flowing to instruction block 47 BAR CUTOFF=CUTOFF B. The flows from 46 and from 47 are to a logic instruction block 51 IS BAR CUTOFF GREATER THAN BAR ELEMENTS having a "no" output 52 flowing to an instruction block 53 ELEMENT IS WIDE and a "yes" output 54 flowing to an instruction block 55 ELEMENT IS NARROW.

The flow from blocks 53 and 55 is to a logic instruction block 56 "Are All 5 Bar Elements Determined" having a "no" output 58 flowing to an instruction block 59 "Advance To Next Bar Element" the flow from which is to logic instruction block 51. Block 56 has a "yes" response 57 which flows to another section of the logic path of the apparatus that makes determinations for each of the four spaces in the character, i.e., to determine as to whether or not an individual space is wide or narrow. Thus, this section is similar in function for the space determination as the aforedescribed section for determination of the wide and narrow bars. For example instruction block 135 compares to instruction block 35, logic blocks 141 and 151 correspond to 41 and 51 respectively, etc.

In operation it will be understood that instruction blocks 35 and 135 will make bar and space cutoff calculations for each character. At block 35 the minimum bar element and maximum bar elements are determined, after which cutoff A and cutoff B are computed. In the same way at 135 the minimum space element and maximum space element are determined, after which cutoff A and cutoff B are computed. Assume that for the bar determination cutoff A is larger than cutoff B; then a "yes" output at 42 flows through 46 to logic instruction block 51 which then determines whether or not bar cutoff A is greater than the actual bar element being evaluated. Assume that the bar cutoff A is actually greater than the bar element width; this then results in a "yes" output flowing via 54 to instruction block 55 which confirms that the bar element under evaluation is narrow.

An example of the operation of the space portion of the system would be to assume that space cutoff A is not larger than space cutoff B. This would result with a "no" output from logic instruction block 141 to flow via 143 to instruction block 147 which instructs that, for this particular character, the desired space cutoff is space cutoff B, the flow from 147 being via 149 to logic instruction block 151 at which point the particular space element is compared with space cutoff B. Assuming that space cutoff B is not greater than the space element being evaluated, then the output from 151 will be a "no" flowing at 152 to the instruction block 153 which confirms that the space element under evaluation is wide.

Thus it can be seen that, for each character in a code (a character being defined as nine elements, i.e., five bars and four spaces and with three of the elements being wide), there is a bar cutoff calculation and for the same character there is an independent space cutoff calculation. Both bar cutoff calculations and space cutoff calculations require a computation of a cutoff A and a cutoff B following which a comparison is made to determine whether cutoff A will be utilized or cutoff B. The larger cutoff is used. The desired cutoff having been selected, then the final step is to use such cutoff as a reference against which to measure the bar or space element under evaluation so as to determine whether such element is wide or narrow. In this manner the digital output data as depicted in FIG. 3 can be accurately evaluated so as to determine whether a space is wide or narrow and whether a bar is wide or narrow. This information then can be utilized according to the system with which it is used.

While I have described a preferred embodiment of the invention, it will be understood that the invention is limited only by the scope of the following claims.

I claim:

1. In a system for optically reading Code 39 bar code data wherein said system comprises (i) an optical code pen for reading bar code data and for producing an analog electrical output signal indicative of such data, and (ii) electrical conditioning means connected to said pen to receive said output and to produce a digital output signal indicative of said bar code data, said digital signal being characterized by relatively narrow and/or wide bars separated by relatively narrow and/or wide spaces, apparatus for interpreting said digital output signal of said system, said apparatus comprising:

(a) means connected to receive said digital output signal and for measuring the time duration of each bar, said time duration data for all bars in a code character being stored, (b) means for receiving said code character time duration data and for identifying the minimum and maximum width bars, (c) means for producing a first bar cutoff value of a time duration approximately 1.5 times the time duration of the minimum width bar, (d) means for producing a second bar cutoff value of a time duration approximately equal to one-half of the sum of the time durations of the minimum and maximum bar widths, (e) means for comparing said first and second bar cutoff values and for using the greater of such values as a reference against which all of the bars in said characters are measured, those bars having a time duration greater than that of said reference bar cutoff value then being interpreted as wide bars and those bars having a time duration less than that of said reference bar cutoff value then being interpreted as narrow bars.

2. In a system for optically reading Code 39 bar code data wherein said system comprises (i) an optical code pen for reading bar code data and for producing an analog electrical output signal indicative of such data, and (ii) electrical conditioning means connected to said pen to receive said output and to produce a digital output signal indicative of said bar code data, said digital signal being characterized by relatively narrow and/or wide bars separated by relatively narrow and/or wide spaces, apparatus for interpreting said digital output signal of said system, said apparatus comprising:

(a) means connected to receive said digital output signal and for measuring the time duration of each space between bars, said time duration data for all spaces in a code character being stored, (b) means for receiving said code character time duration data and for identifying the minimum and maximum width spaces, (c) means for producing a first space cutoff value of a time duration approximately 1.5 times the time duration of the minimum width space, (d) means for producing a second space cutoff value of a time duration approximately equal to one-half of the sum of the time durations of the minimum and maximum space widths, (e) means for comparing said first and second space cutoff values and for using the greater of such values as a reference against which all of the spaces in said characters are measured, those spaces having a time duration greater than that of said reference space cutoff value then being interpreted as wide spaces and those spaces having a time duration less than that of said reference space cutoff value then being interpreted as narrow spaces.

3. In a system for optically reading Code 39 bar code data wherein said system comprises (i) an optical code pen for reading bar code data and for producing an analog electrical output signal indicative of such data, and (ii) electrical conditioning means connected to said pen to receive said output and to produce a digital output signal indicative of said bar code data, said digital signal being characterized by relatively narrow and/or wide bars separated by relatively narrow and/or wide spares, apparatus for interpreting said digital output signal of said system, said apparatus comprising:

(a) means connected to receive said digital output signal and for measuring the time duration of each bar and of each space between bars, said time duration data for all bars and all spaces in a code character being stored, (b) means for receiving said code character time duration data and for identifying the minimun and maximum width bars, (c) means for producing a first bar cutoff value of a time duration approximately 1.5 times the time duration of the minimum width bar, (d) means for producing a second bar cutoff value of a time duration approximately equal to one-half of the sum of the time durations of the minimum and maximum bar widths, (e) means for comparing said first and second bar cutoff values and for using the greater of such values as a reference against which all of the bars in said characters are measured, those bars having a time duration greater than that of said reference bar cutoff value then being interpreted as wide bars and those bars having a time duration less than that of said reference bar cutoff value then being interpreted as narrow bars, (f) means for receiving said code character time duration data and for identifying the minimum and maximum width spaces, (g) means for producing a first space cutoff valve of a time duration approximately 1.5 times the time duration of the minimum width space, (h) means for producing a second space cutoff value of a time duration approximately equal to one-half of the sum of the time durations of the minimum and maximum space widths, and (i) means for comparing said first and second space cutoff values and for using the greater of such values as a reference against which all of the spaces in said characters are measured, those spaces having a time duration greater than that of said reference space cutoff value then being interpreted as wide spaces and those spaces having a time duration less than that of said reference space cutoff value then being interpreted as narrow spaces.

* * * * *